(12) United States Patent
Chen

(10) Patent No.: US 9,858,087 B2
(45) Date of Patent: Jan. 2, 2018

(54) SYSTEM PLATFORM SUPPORTING INFRARED RECEIVER/TRANSMITTER AND OPERATION METHOD THEREOF

(71) Applicant: Insyde Software Corp., Taipei (TW)

(72) Inventor: Po Sen Chen, Taipei (TW)

(73) Assignee: Insyde Software Corp., Taipei (TW)

( * ) Notice: Subject to any disclaimer, the term of this patent is extended or adjusted under 35 U.S.C. 154(b) by 264 days.

(21) Appl. No.: 14/328,453

(22) Filed: Jul. 10, 2014

(65) Prior Publication Data

US 2015/0019855 A1 Jan. 15, 2015

(30) Foreign Application Priority Data

Jul. 11, 2013 (TW) .............................. 102124864 A

(51) Int. Cl.
*G06F 9/44* (2006.01)
*G06F 13/10* (2006.01)

(52) U.S. Cl.
CPC .......... *G06F 9/4411* (2013.01); *G06F 13/102* (2013.01)

(58) Field of Classification Search
CPC .... G06F 9/4401; G06F 9/4411; G06F 13/102; G06F 13/24; G06F 13/382
See application file for complete search history.

(56) References Cited

U.S. PATENT DOCUMENTS 6,480,914 B1 * 11/2002 Hsieh .................... G06F 13/105
710/15
6,496,891 B1 * 12/2002 Cluff ....................... G06F 3/023
703/24
6,499,102 B1 * 12/2002 Ewertz .................. G06F 1/3203
713/1
6,615,288 B1 * 9/2003 Herzi ..................... G06F 13/24
710/10
6,636,157 B1 * 10/2003 Sato ........................ H04B 1/205
340/12.5

(Continued)

OTHER PUBLICATIONS

Microsoft Computer Dictionary, Fifth Edition. Redmond, Wash: Microsoft, 2002. Print. ISBN: 978-0-7356-1495-6.*

(Continued)

*Primary Examiner* — Jaweed A Abbaszadeh
*Assistant Examiner* — Brian J Corcoran
(74) *Attorney, Agent, or Firm* — Muncy, Geissler, Olds & Lowe, P.C.

(57) ABSTRACT

An operation method of a system platform includes steps of: transmitting, by an infrared receiver, a received infrared signal to a transmission interface; transmitting, by the transmission interface, an interrupt notification signal to an operation system power management agent (OSPM) through an advanced configuration and power interface (ACPI); receiving, by an infrared application program of an operating system, the interrupt notification signal from the OSPM, so as to generate a system management interrupt (SMI) in a universal extensible firmware interface (UEFI) basic input output system (BIOS) to execute a system management mode (SMM) program; and executing, by the UEFI BIOS, a decoding driver program, and receiving the infrared signal from the transmission interface, so as to decode the infrared signal into event data, and store the event data in a storage device.

20 Claims, 8 Drawing Sheets

(56) References Cited

U.S. PATENT DOCUMENTS

| | | | |
|---|---|---|---|
| 7,093,116 B2* | 8/2006 | Chen | G06F 9/4411 713/1 |
| 7,146,512 B2* | 12/2006 | Rothman | G06F 9/4401 713/300 |
| 2003/0135534 A1* | 7/2003 | Nalawadi | G06F 9/4812 718/100 |
| 2005/0114719 A1* | 5/2005 | Stedman | G06F 1/3203 713/310 |
| 2006/0026323 A1* | 2/2006 | Ando | G06F 13/24 710/260 |
| 2007/0076750 A1* | 4/2007 | Kleewin | H04W 4/18 370/466 |
| 2007/0260761 A1* | 11/2007 | Lu | G06F 9/4411 710/8 |
| 2008/0028200 A1* | 1/2008 | Polyudov | G06F 9/4411 713/2 |
| 2008/0270779 A1* | 10/2008 | Wilson | G06F 9/4401 713/1 |
| 2009/0278679 A1* | 11/2009 | Dailey | G06F 9/542 340/500 |
| 2009/0320128 A1* | 12/2009 | Pant | G06F 21/44 726/22 |
| 2010/0017796 A1* | 1/2010 | Walker | G06F 9/4411 717/174 |
| 2010/0262743 A1* | 10/2010 | Zimmer | G06F 9/4812 710/267 |
| 2012/0079118 A1* | 3/2012 | Bailey | H04W 4/001 709/227 |
| 2014/0146183 A1* | 5/2014 | Ouyang | H04N 5/44 348/180 |
| 2015/0220088 A1* | 8/2015 | Joshi | G06F 11/00 700/282 |

OTHER PUBLICATIONS

Various, "Unified Extensible Firmware Interface." Wikipedia. Wikimedia Foundation, Jun. 29, 2013. Web. Jan. 20, 2017. <https://en.wikipedia.org/w/index.php?title=Unified_Extensible_Firmware_Interface&oldid=562069606>.*

Lewis, Tim, and Cassit Liu. "BIOS Undercover: Writing a Software SMI Handler." Phoenix BIOS Developer Blog. Phoenix Technologies, Dec. 8, 2008. Web. Jan. 20, 2017. <http://blogs.phoenix.com/phoenix_technologies_bios/2008/12/bios-undercover-writing-a-software-smi-handler.html>.*

Doran, Mark, Vincent J. Zimmer, and Michael A. Rothman. "Beyond BIOS: Exploring the Many Dimensions of the Unified Extensible Firmware Interface." Intel Technology Journal 15.1 (2011).*

* cited by examiner

SYSTEM PLATFORM SUPPORTING INFRARED RECEIVER/TRANSMITTER AND OPERATION METHOD THEREOF

BACKGROUND

Technical Field

The present invention relates to a system platform supporting an infrared receiver/transmitter and an operation method thereof, and more particularly, to a system platform applied to a computer, a tablet computer, a smart phone or the like to support application and operation of an infrared receiver/transmitter.

Related Art

Infrared data transmission is safe, low-cost and convenient, and has a wide range in application. Data transmitted by using infrared may be translated from a digital form into an electronic signal and then transmitted in a single direction. An infrared receiving device, after receiving the electronic signal, converts the electronic signal to the original data form. Transmission of a consumer infrared (CIR) may provide a service in a far range, the range of transmission varies according to different infrared transmission apparatuses, and a transmission distance thereof may reach several meters. The CIR may be used to control consumer devices such as a remote controller of a television set and a garage door switch.

When the CIR is applied to a system platform such as a computer, a tablet computer or a smart phone, a conventional interface between a CIR receiver/transmitter and the system platform is an embedded controller (EC), a super IO (SIO) or a universal asynchronous receiver/transmitter (UART). During a booting stage, a basic input output system (BIOS) initials/sets up a CIR_RX#/CIR_TX# port, but the BIOS does not execute a decoding/coding program for a received/transmitted infrared electronic signal.

For the application of the CIR in a system platform such as a computer, a tablet computer or a smart phone, hardware configuration mechanisms such as the EC/SIO are not based on industrial standards, manufacturers of different system platforms have different configuration mechanisms, and configuring an EC/SIO in a system platform may increase hardware cost. For a tablet computer or a smart phone, hardware such as the EC or keyboard controller (KBC) is not configured or present, and therefore, the CIR is quite difficult to be applied to the tablet computer or the smart phone.

SUMMARY

In view of the above problems, the present invention provides a system platform supporting an infrared receiver/transmitter and an operation method thereof. According to the present application, hardware such as EC/SIO/KBC is not required to be configured, thereby reducing hardware cost, and easily applying the CIR to the system platform.

A first aspect of the present invention provides an operation method of a system platform, which includes the following steps:

transmitting, by the infrared receiver, a received infrared signal to a transmission interface;

transmitting, by the transmission interface, an interrupt notification signal to an operation system power management agent (OSPM) through an advanced configuration and power interface (ACPI);

receiving, by an infrared application program running under the operating system, the interrupt notification signal from the OSPM, so as to generate a system management interrupt (SMI) in a universal extensible firmware interface (UEFI) BIOS to execute a system management mode (SMM) program; and executing, by the UEFI BIOS, a decoding driver program thereof, receiving the infrared signal from the transmission interface, so as to decode the infrared signal to event data, and store the event data in a storage device.

A second aspect of the present invention provides an operation method of a system platform, which includes the following steps:

transmitting, by an infrared receiver, a received infrared signal to a transmission interface;

executing, by a UEFI BIOS, a decoding driver program thereof, where the UEFI BIOS monitors the transmission interface, so as to receive the infrared signal transmitted by the transmission interface; and decoding, by the UEFI BIOS, the infrared signal into event data, and storing the event data in a storage device.

According to the first aspect of the present invention, the present invention provides a system platform, and the system platform includes:

an infrared receiver, used to receive an infrared signal in an operating system stage;

a transmission interface, used to receive the infrared signal transmitted by the infrared receiver;

an ACPI, used to receive an interrupt notification signal sent by the transmission interface;

an OSPM, used to receive the interrupt notification signal sent by the ACPI;

a UEFI BIOS, used to receive the infrared signal from the transmission interface, and decode the infrared signal into event data; and a storage device, used for the UEFI BIOS to store the event data therein, where an infrared application program running under the operating system receives the interrupt notification signal from the OSPM, so as to generate an SMI in the UEFI BIOS to execute an SMM program; the UEFI BIOS executes a decoding driver program, receives the infrared signal from the transmission interface, decodes the infrared signal into the event data, and stores the event data in the storage device.

According to the second aspect of the present invention, the present invention provides a system platform, and the system platform includes:

an infrared receiver, used to receive an infrared signal in a booting stage;

a transmission interface, used to receive the infrared signal transmitted by the infrared receiver;

a UEFI BIOS, used to receive the infrared signal transmitted by the transmission interface, and decode the infrared signal into event data; and a storage device, used for the UEFI BIOS to store the event data therein, where the UEFI BIOS executes a decoding driver program, monitors the transmission interface, decodes the infrared signal transmitted by the transmission interface into the event data, and stores the event data in the storage device.

DETAILED DESCRIPTION

In order to make persons of ordinary skill in the art further understand the present invention, several preferred embodiments of the present invention are described in the following, and construction content and effects to be achieved of the present invention are described in detail with reference to the accompanying drawings.

Figure 1:
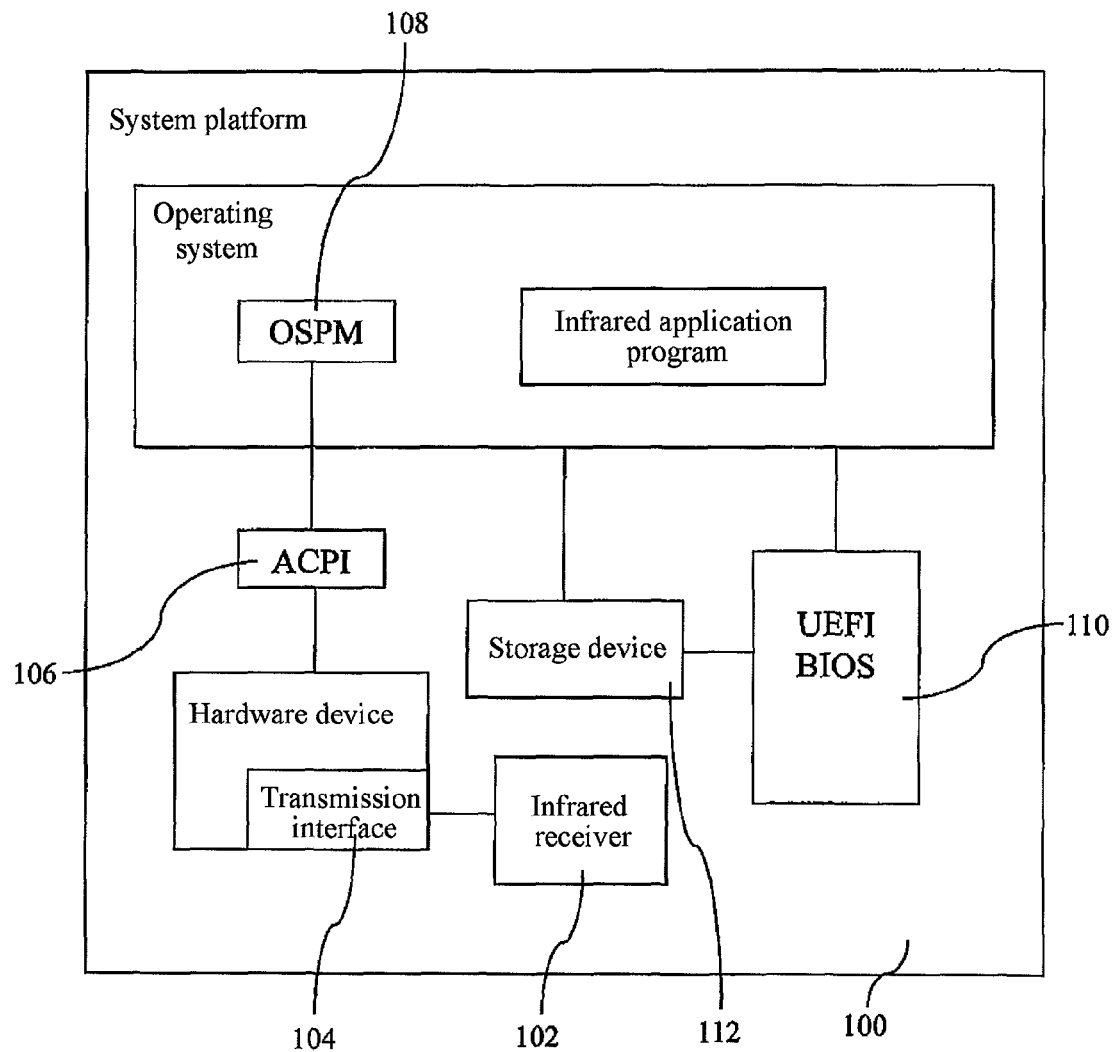
FIG. 1 is a system block diagram of a system platform according to a first embodiment of the present invention.

FIG. 1 is a system block diagram of a system platform according to a first embodiment of the present invention. In FIG. 1, hardware and firmware in a system platform 100, such as a computer, a tablet computer or a smart phone, include an infrared receiver 102, a transmission interface 104, an advanced configuration and power interface (ACPI) 106, an operation system power management agent which is shortened to OSPM 108, a universal extensible firmware interface (UEFI) BIOS 110 and a storage device 112.

The transmission interface 104 is a general purpose input output (GPIO), a radio frequency (RF) interface, a BLUETOOTH, a near field communication (NFC) interface, a secure digital I/O (SD I/O), a serial peripheral interface (SPI) or a universal serial bus (USB).

The GPIO is a flexible and software controllable digital signal input/output interface. The design of GPIO is provided on a device such as a central processing unit (CPU) or a power management unit (PMU). The GPIO may be configured such that it can detect digital transitions from 0 to 1 or 1 to 0 and, optionally, generate an interrupt such as the aforesaid SMI.

The ACPI is a power management standard, and aims to perform effective control and management on the power by using an operating system instead of the BIOS, thereby saving more power. Therefore, a chip used must provide a standard registration interface for the operating system, and should allow the operating system to perform power interrupt and power recovery for different chips.

Operation system power management is an operating system technology for managing the power of the underlying platform and switching it between different power states. OSPM 108 enables a platform or system to implement the most efficient power mode and is applicable across all devices and components within a platform/system. In operation system power management architecture, the operating system can directly perform power state changes on all systems and apparatuses. Generally, the operating system uses settings of an application program or setting of a user as a reference of entering a power-saving mode, and the operating system uses the ACPI to control power state of hardware.

In FIG. 1, the infrared receiver 102 receives an infrared signal, where the infrared receiver 102 applies a CIR and the infrared signal is an electronic signal. The transmission interface 104 in hardware devices of the system platform 100 receives the infrared signal transmitted by the infrared receiver 102, and transmits an interrupt notification signal. The ACPI 106 receives the interrupt notification signal transmitted by the transmission interface 104. The OSPM 108 receives the interrupt notification signal transmitted by the ACPI 106. The UEFI BIOS 110 receives the infrared signal from the transmission interface 104, and decodes the infrared signal into event data. The UEFI BIOS 110 stores the event data in a storage device 112 such as a memory.

The system platform 100 executes an infrared application program in the operating system, so as to generate a system management interrupt (SMI) in the UEFI BIOS 110, the UEFI BIOS 110 receives a request of the SMI to execute an system management mode (SMM) program, and at this time, the system platform enters a BIOS stage from an operating system stage.

The SMM program enables, by using the SMI, the system platform 100 to enter the BIOS stage from the operating system stage, and by executing a restore execution state from SMRAM and return to previous CPU mode (RSM) instruction, the system platform 100 exits the SMM stage. The program executed in the SMM mode is referred to as an SMM processing program, and all SMM processing programs are run in a space called system management RAM (SMRAM). The SMM processing program is implemented by system firmware.

In the BIOS SMM stage, the UEFI BIOS 110 executes an SMM decoding driver program, the UEFI BIOS 110 decodes the infrared signal from the transmission interface 104 into event data, and stores the event data in the storage device 112. After the UEFI BIOS 110 executes the decoding driver program, the system platform 100 returns to the operating system stage from the BIOS stage, and the system platform 100 continues to execute the infrared application program, so that the storage device 112 accesses the event data, and the infrared application program generates a control event according to the accessed event data, for example, an event of operating a keyboard or a mouse.

An operation method of a system platform supporting an infrared receiver according to the first embodiment of the present invention is described in the following. The system block diagram of FIG. 1 is referred to when an operation procedure of the first embodiment of the present invention is described.

Figure 2:
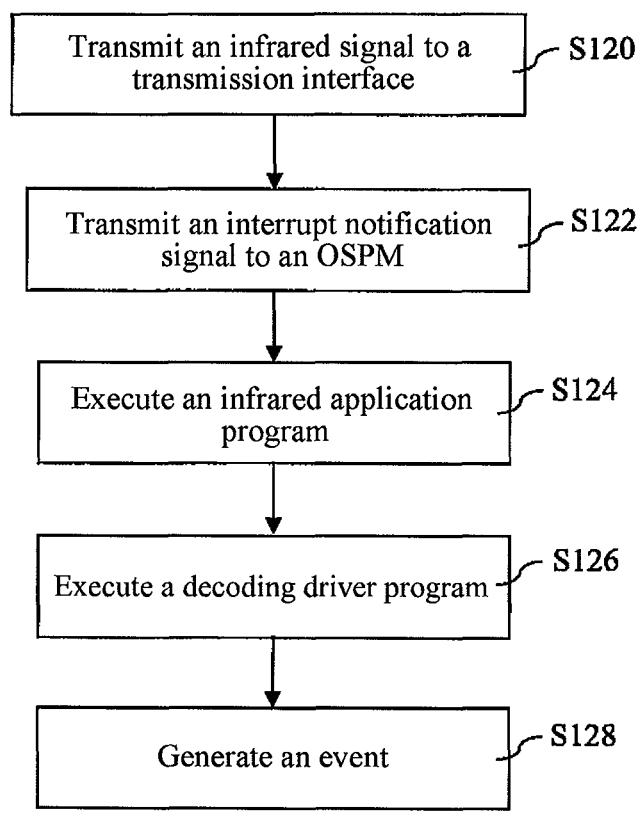
FIG. 2 is a flowchart of an operation method of a system platform supporting an infrared receiver according to the first embodiment of the present invention.

FIG. 2 is a flowchart of the operation method of a system platform supporting an infrared receiver according to the first embodiment of the present invention. In FIG. 2, the system platform 100 is in the operating system stage, and when the infrared receiver 102 receives an infrared signal, where the infrared receiver 102 applies a CIR and the infrared signal is an electronic signal, the infrared receiver 102 transmits the infrared signal to the transmission interface 104 in hardware devices of the system platform 100 (step S120).

When the transmission interface 104 receives the infrared signal, the transmission interface 104 transmits an interrupt notification signal to the OSPM 108 through the ACPI 106 (step S122).

The system platform 100 executes an infrared application program running under the operating system, and the infrared application program receives the interrupt notification signal from the OSPM 108, and generates an SMI in the UEFI BIOS 110, so that the system platform 100 executes an SMM program (step S124).

In the SMM program, the system platform 100 enters the BIOS stage from the operating system stage, the UEFI BIOS 110 executes a decoding driver program, and the UEFI BIOS 110 receives the infrared signal from the transmission interface 104, so as to decode the infrared signal into event data, and store the event data in the storage device 112 such as a memory (step S126).

For example, after the UEFI BIOS 110 executes the RSM instruction, the system platform 100 returns from the BIOS stage to the operating system stage, that is, the system platform 100 returns from the SMM program to continue to execute the infrared application program, accesses the event data from the storage device 112, and generates a control event according to the event data, for example, an event of operating a keyboard or a mouse (step S128).

Figure 3:
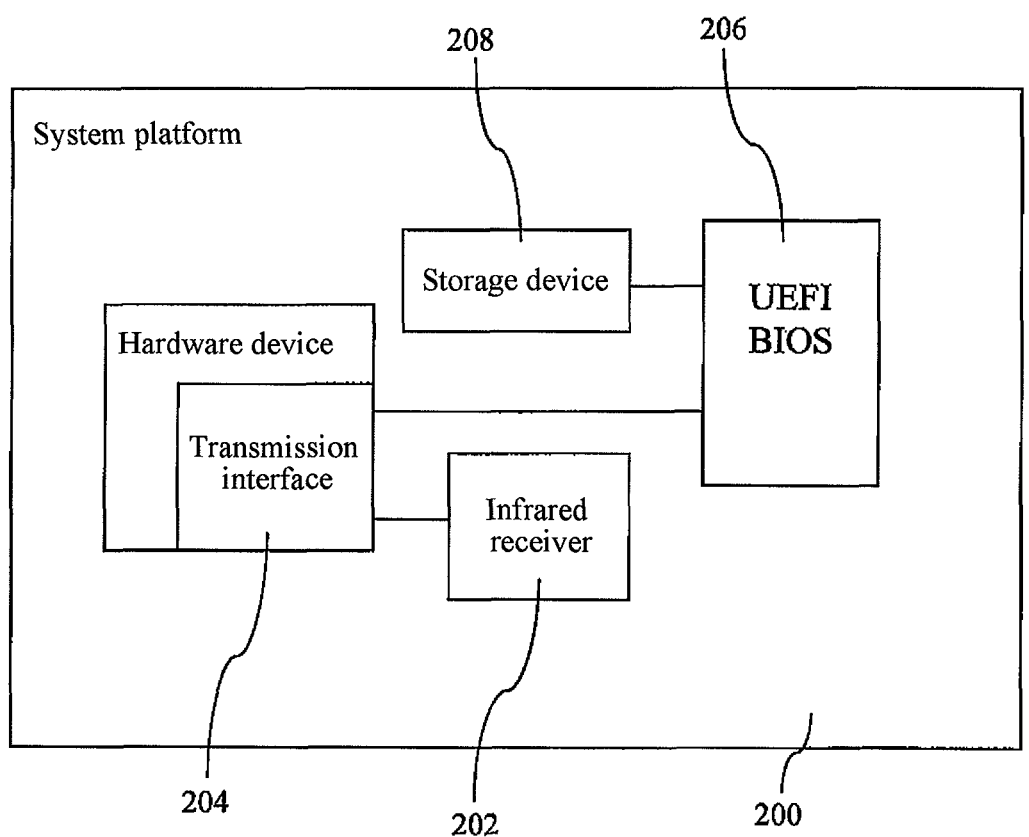
FIG. 3 is a system block diagram of a system platform according to a second embodiment of the present invention.

FIG. 3 is a system block diagram of a system platform according to a second embodiment of the present invention. In FIG. 3, hardware and firmware in a system platform 200, such as a computer, a tablet computer or a smart phone, include an infrared receiver 202, a transmission interface 204, a UEFI BIOS 206 and a storage device 208.

The transmission interface 204 is a GPIO, an RF interface, a BLUETOOTH, an NFC interface, an SD I/O, an SPI or a USB.

When the system platform 200 is in a booting stage, the infrared receiver 202 receives an infrared signal, where the infrared receiver 202 applies a CIR and the infrared signal is an electronic signal. The transmission interface 204 in hardware devices of the system platform 200 receives the infrared signal transmitted by the infrared receiver 202. The UEFI BIOS 206 receives the infrared signal transmitted by the transmission interface 204, and decodes the infrared signal into event data. The UEFI BIOS 206 stores the event data in the storage device 208 such as a memory.

The UEFI BIOS 206 executes a decoding driver program, and monitors the transmission interface 204; when the transmission interface 204 receives the infrared signal, the UEFI BIOS 206 checks to see whether the infrared signal received by the transmission interface 204 is correct, and decodes the infrared signal transmitted by the transmission interface 204 into event data. The UEFI BIOS 206 stores the event data in the storage device 208. The UEFI BIOS 206 generates an event according to the event data, where the event is, for example, the UEFI BIOS 206 accesses a corresponding specific address applied to generate an operation of a keyboard or a mouse.

An operation method of a system platform supporting an infrared receiver according to the second embodiment of the present invention is described in the following. The system block diagram of FIG. 3 is referred to when an operation procedure of the second embodiment of the present invention is described.

Figure 4:
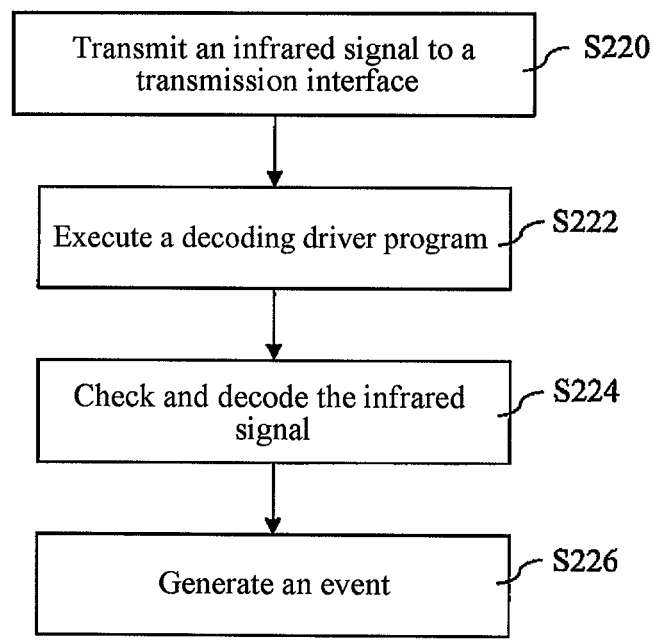
FIG. 4 is a flowchart of an operation method of a system platform supporting an infrared receiver according to the second embodiment of the present invention.

FIG. 4 is a flowchart of the operation method of a system platform supporting an infrared receiver according to the second embodiment of the present invention. In FIG. 4, the system platform 200 is in a booting stage, and when the infrared receiver 202 receives an infrared signal, where the infrared receiver 202 applies a CIR and the infrared signal is an electronic signal, the infrared receiver 202 transmits the infrared signal to the transmission interface 204 in hardware devices of the system platform 200 (step S220).

The UEFI BIOS 206 executes a decoding driver program, and monitors the transmission interface 204; when the transmission interface 204 receives the infrared signal, the UEFI BIOS 206 receives the infrared signal transmitted by the transmission interface 204 (step S222).

The UEFI BIOS 206 checks to see whether the received infrared signal is correct, and if it is found that the infrared signal is incorrect, for example, the infrared signal is a noise, the UEFI BIOS 206 discards the received signal; if it is found that the infrared signal is correct, the UEFI BIOS 206 decodes the infrared signal into event data, and stores the event data in the storage device 208 such as a memory (step S224). The UEFI BIOS 206 generates an event according to the event data, where the event is that the UEFI BIOS 206 accesses a corresponding specific address applied to generate an operation of a keyboard or a mouse.

Figure 5:
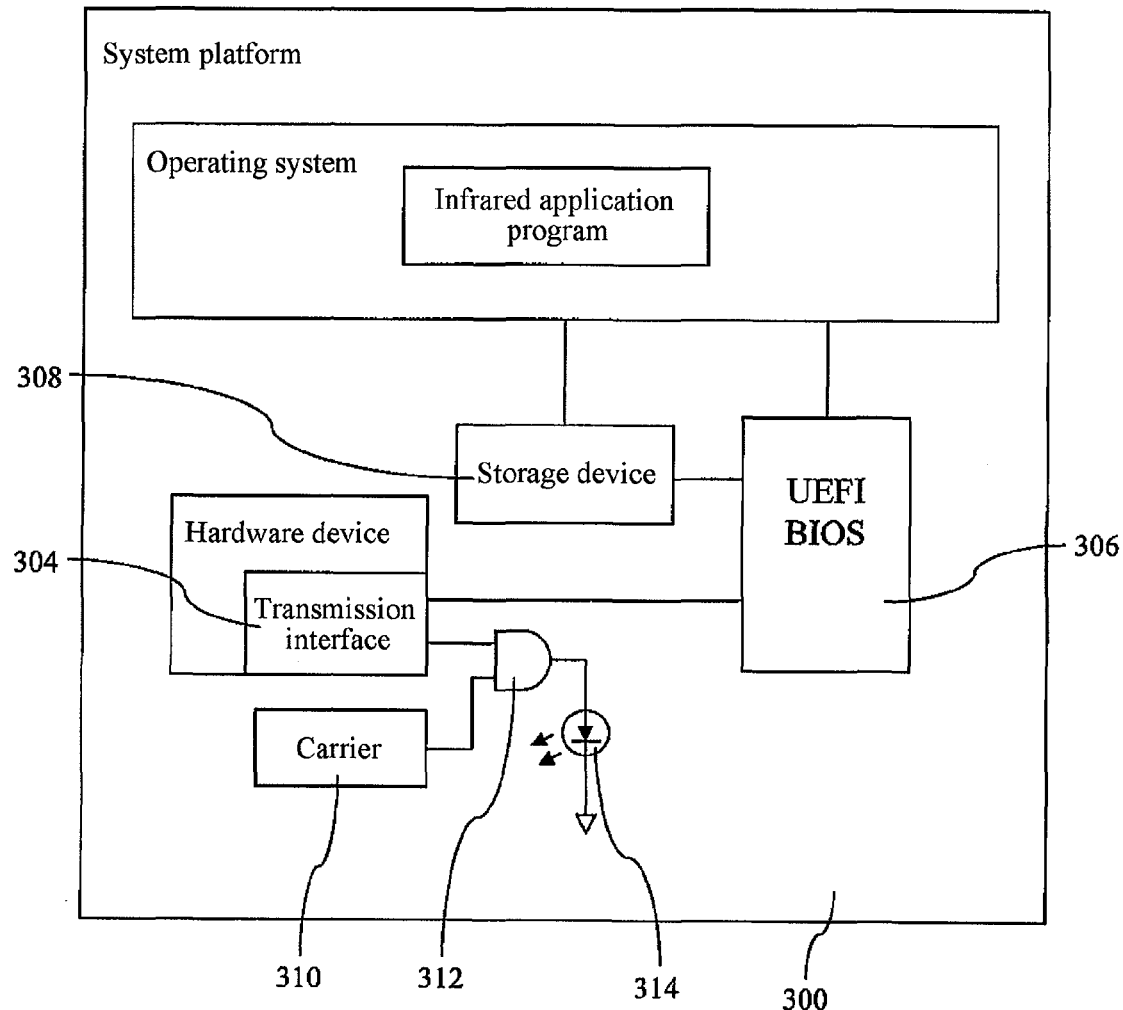
FIG. 5 is a system block diagram of a system platform according to a third embodiment of the present invention.

FIG. 5 is a system block diagram of a system platform according to a third embodiment of the present invention. In FIG. 5, hardware and firmware in a system platform 300, such as a computer, a tablet computer or a smart phone, include an infrared transmitter, a transmission interface 304, a UEFI BIOS 306 and a storage device 308.

The transmission interface 304 is a GPIO, an RF interface, a BLUETOOTH, an NFC interface, an SD I/O, an SPI or a USB.

The storage device 308 such as a memory stores event data. The UEFI BIOS 306 accesses the event data from the storage device 308, and codes the event data into an infrared impulse signal, and the UEFI BIOS 306 transmits the infrared impulse signal to the transmission interface 304 in hardware devices of the system platform 300 The transmission interface 304 transmits the infrared impulse signal to the infrared transmitter. The infrared transmitter adds the received infrared impulse signal into a carrier signal to generate an infrared signal, where the infrared signal is an electronic signal, and transmits the infrared signal to an infrared receiver (not shown) at external of the system platform 300. The event data refers to data used to control an operation event of a remote device such as a keyboard or a mouse.

The infrared transmitter includes a carrier 310, an AND gate 312 and an infrared light emitting diode (LED) 314. The carrier 310 generates a carrier signal, and outputs the carrier signal to an input terminal of the AND gate 312. The transmission interface 304 outputs the infrared impulse signal to the other input terminal of the AND gate 312. The AND gate 312 performs an AND gate operation on the received carrier signal and the infrared impulse signal to generate an infrared signal, and an output terminal of the AND gate 312 outputs the infrared signal to the infrared LED 314. The infrared LED 314 transmits the infrared signal output by the AND gate 312 to the infrared receiver (not shown) at external of the system platform 300.

The system platform 300 executes an infrared application program running under the operating system to generate an SMI in the UEFI BIOS 306, so that the system platform 300 executes an SMM program. The UEFI BIOS 306 executes a coding driver program, and the UEFI BIOS 306 accesses the event data from the storage device 308 so as to code the event data into an infrared impulse signal. The UEFI BIOS 306 transmits the infrared impulse signal to the other input terminal of the AND gate 312 of the infrared transmitter through the transmission interface 304.

An operation method of a system platform supporting an infrared transmitter according to the third embodiment of the present invention is described in the following. The system block diagram of FIG. 5 is referred to when an operation procedure of the third embodiment of the present invention is described.

Figure 6:
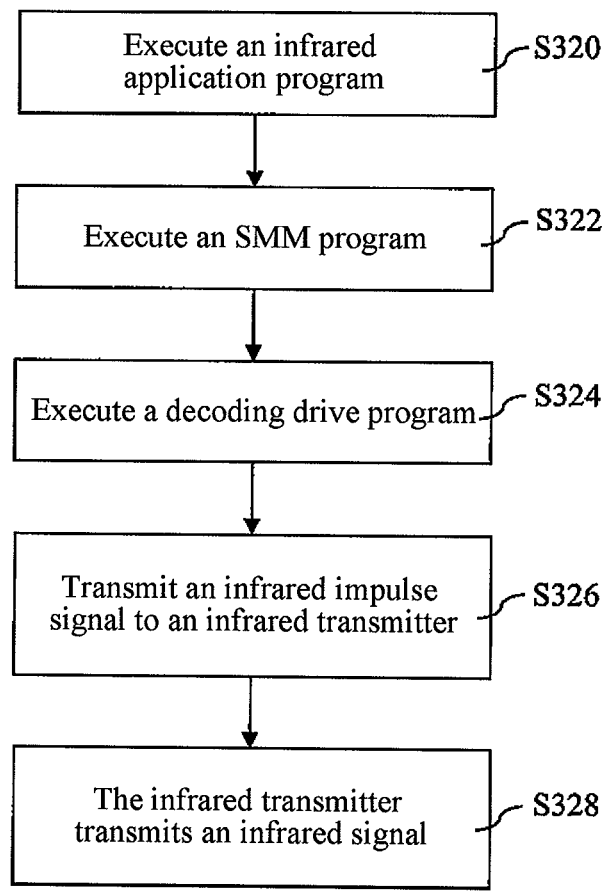
FIG. 6 is a flowchart of an operation method of a system platform supporting an infrared transmitter according to the third embodiment of the present invention.

FIG. 6 is a flowchart of the operation method of a system platform supporting an infrared transmitter according to the third embodiment of the present invention. In FIG. 6, the system platform 300 is in an operating system stage, the system platform 300 executes an infrared application program running under the operating system, and the system platform 300 stores event data in the storage device 308 such as a memory (step S320). The event data refers to data used to control an operation event of a remote device such as a keyboard or a mouse.

The system platform 300 generates an SMI in the UEFI BIOS 306, so that the system platform 300 executes an SMM program (step S322). In the SMM program, the system platform 300 enters a BIOS stage from the operating system stage, the UEFI BIOS 306 executes a coding driver program, and the UEFI BIOS 306 accesses the event data from the storage device 308 to code the event data into an infrared impulse signal (step S324).

The UEFI BIOS 306 controls the transmission interface 304 in hardware devices of the system platform 300, so that the UEFI BIOS 306 transmits the infrared impulse signal to the infrared transmitter through the transmission interface 304, that is, the UEFI BIOS 306 transmits the infrared impulse signal to the other input terminal of the AND gate 312 through the transmission interface 304 (step S326).

The infrared transmitter adds a carrier signal into the infrared impulse signal to generate an infrared signal, and transmits the infrared signal to an infrared receiver at external of the system platform 300 (step S328).

In step S328, the carrier 310 outputs a carrier signal to an input terminal of the AND gate 312; the transmission interface 304 outputs the infrared impulse signal to the other input terminal of the AND gate 312; the AND gate 312 performs an AND gate operation on the carrier signal and the infrared impulse signal to generate an infrared signal, and the output terminal of the AND gate 312 outputs the infrared signal to the infrared LED 314; and the infrared LED 314 transmits the infrared signal to the infrared receiver at external of the system platform 300.

Figure 7:
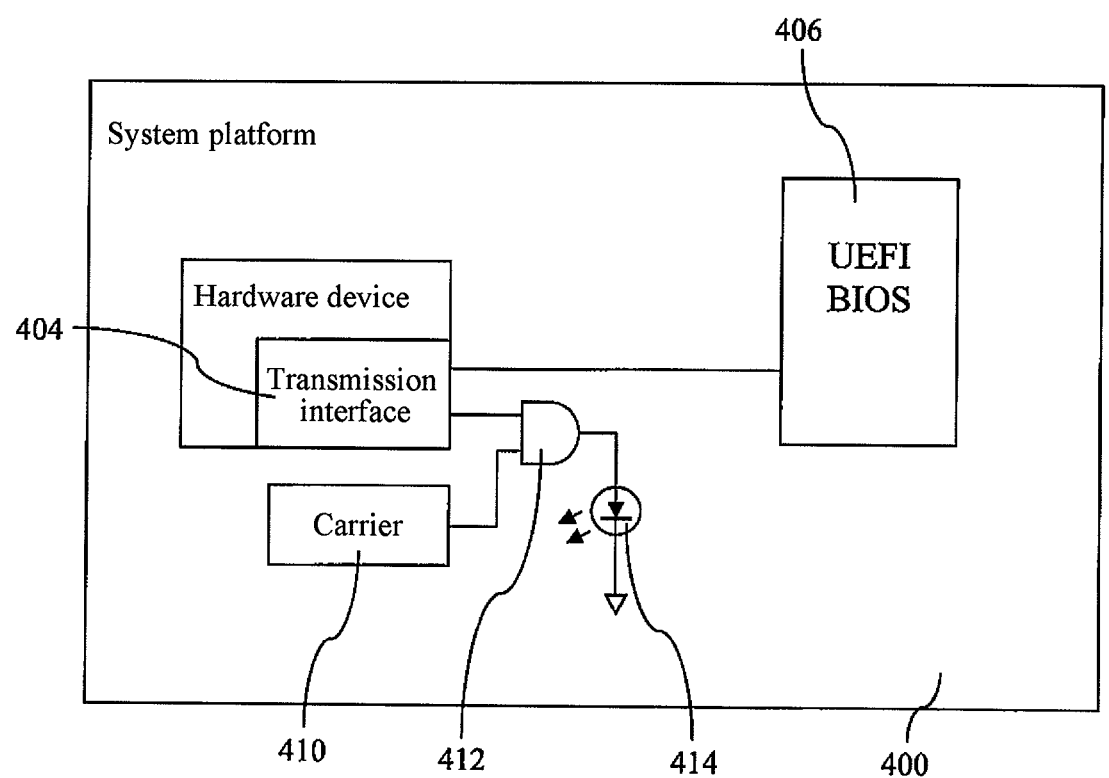
FIG. 7 is a system block diagram of a system platform according to a fourth embodiment of the present invention.

FIG. 7 is a system block diagram of a system platform according to a fourth embodiment of the present invention. In FIG. 7, hardware and firmware in a system platform 400, such as a computer, a tablet computer or a smart phone, include an infrared transmitter, a transmission interface 404, and a UEFI BIOS 406.

The transmission interface 404 is a GPIO, an RF interface, a BLUETOOTH, an NFC interface, an SD I/O, an SPI or a USB.

The UEFI BIOS 406 codes event data into an infrared impulse signal, and the UEFI BIOS 406 transmits the infrared impulse signal to the transmission interface 404 in hardware devices of the system platform 400. The transmission interface 404 transmits the infrared impulse signal to the infrared transmitter. The infrared transmitter converts the received infrared impulse signal into an infrared signal, where the infrared signal is an electronic signal, and transmits the infrared signal to at external an infrared receiver (not shown) of the system platform 400. The event data refers to data used to control an operation event of a remote device such as a keyboard or a mouse.

The infrared transmitter includes a carrier 410, an AND gate 412 and an infrared LED 414. The carrier 410 generates a carrier signal, outputs the carrier signal to an input terminal of the AND gate 412. The transmission interface 404 outputs the infrared impulse signal to the other input terminal of the AND gate 412. The AND gate 412 performs an AND gate operation on the received carrier signal and the infrared impulse signal to generate an infrared signal, an output terminal of the AND gate 412 outputs the infrared signal to the infrared LED 414. The infrared LED 414 transmits the infrared signal output from the AND gate 412 to the infrared receiver (not shown) at external of the system platform 400.

The UEFI BIOS 406 receives an infrared transmission request, so as to execute a coding driver program to code event data into an infrared impulse signal. The UEFI BIOS 406 transmits the infrared impulse signal to the other input terminal of the AND gate 412 of the infrared transmitter through the transmission interface 404.

An operation method of a system platform supporting an infrared transmitter according to the fourth embodiment of the present invention is described in the following. The system block diagram of FIG. 7 is referred to when an operation procedure of the fourth embodiment of the present invention is described.

Figure 8:
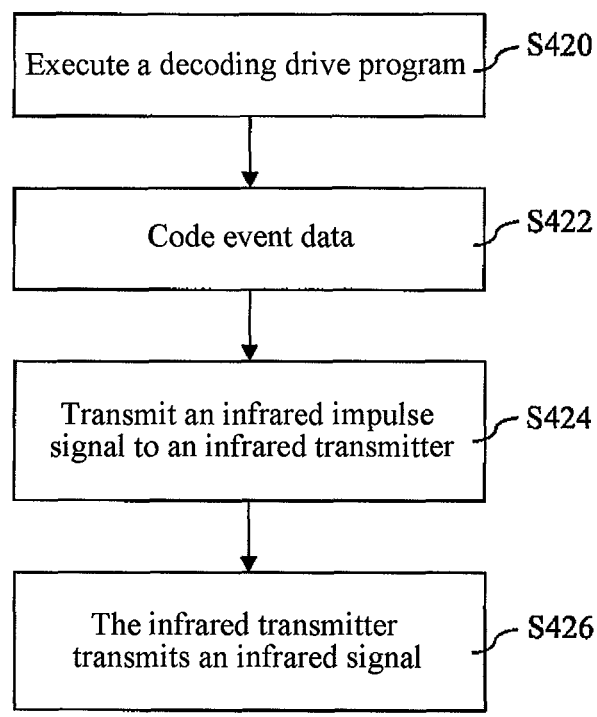
FIG. 8 is a flowchart of an operation method of a system platform supporting an infrared transmitter according to the fourth embodiment of the present invention.

FIG. 8 is a flowchart of the operation method of a system platform supporting an infrared transmitter according to the fourth embodiment of the present invention. In FIG. 8, the system platform 400 is in a booting stage, and when the UEFI BIOS 406 receives an infrared transmission request, the UEFI BIOS 406 executes a coding driver program (step S420).

The UEFI BIOS 406 codes event data into an infrared impulse signal (step S422). The event data refers to data used to control an operation event of a remote device such as a keyboard or a mouse. The UEFI BIOS 406 controls the transmission interface 404 in the hardware devices of the system platform 400, so that the UEFI BIOS 406 transmits the infrared impulse signal to the infrared transmitter through the transmission interface 404, that is, the UEFI BIOS 406 transmits the infrared impulse signal to the other input terminal of the AND gate 412 through the transmission interface 404 (step S424).

The infrared transmitter adds a carrier signal into the infrared impulse signal to generate an infrared signal, and transmits the infrared signal to an infrared receiver at external of the system platform 400 (step S426).

In step S426, the carrier 410 outputs a carrier signal to an input terminal of the AND gate 412; the transmission interface 404 outputs an infrared impulse signal to the other input terminal of the AND gate 412; the AND gate 412 performs an AND gate operation on the carrier signal and the infrared impulse signal to generate an infrared signal, and an output terminal of the AND gate 412 outputs the infrared signal to the infrared LED 414; and the infrared LED 414 transmits the infrared signal to the infrared receiver at external of the system platform 400.

According to the descriptions of the embodiments, the present invention provides a system platform supporting an infrared receiver/transmitter and an operation method thereof/for an application of a CIR in a system platform such as a computer, a tablet computer or a smart phone, original hardware and firmware such as a transmission interface, an ACPI, an OSPM, a UEFI BIOS and a storage device of the system platform may be utilized to implement the application of the CIR, without the need of configuring hardware or firmware such as an EC/SIO/KBC, thereby reducing hardware cost, and easily applying the CIR to the system platform.

The present invention is described through the preferred embodiments and exemplary accompanying drawings; however, they are not intended to limit the present invention. Any modification, omission and variation made by a person skilled in the art on a form and content of the embodiments should fall in the scope of claims of the present invention.

What is claimed is:

1. An operation method of a system platform, comprising:
receiving, by an infrared receiver, an infrared signal from a consumer infrared (CIR) device, the infrared signal containing encoded event data;
transmitting, by the infrared receiver, the infrared signal to a transmission interface;
generating, by the transmission interface, an interrupt notification signal in response to the received infrared signal;
transmitting, by the transmission interface, the interrupt notification signal to an operation system power management agent (OSPM) via an advanced configuration and power interface (ACPI);
transmitting, by the transmission interface, the infrared signal to a universal extensible firmware interface (UEFI) basic input output system (BIOS);
executing an infrared application program running under an operating system stage in response to the interrupt notification signal received from the transmission interface to generate a system management interrupt (SMI) in the UEFI BIOS to execute a system management mode (SMM) program, causing the system platform to enter a BIOS stage from the operating system stage; and
executing, by the UEFI BIOS in the BIOS stage, a decoding driver program, to decode the infrared signal into event data, and store the event data in a storage device.

2. The operation method of a system platform according to claim 1, further comprising:
returning from the SMM program to execute the infrared application program;
accessing the event data from the storage device; and
generating an event according to the event data accessed from the storage device.

3. The operation method of a system platform according to claim 1, further comprising:
executing, by the UEFI BIOS, a coding driver program, so that the storage device accesses the event data and codes the event data into an infrared impulse signal; and
transmitting, by the UEFI BIOS, the infrared impulse signal to an infrared transmitter through the transmission interface.

4. The operation method of a system platform according to claim 3, further comprising:
adding, by the infrared transmitter, a carrier signal into the infrared impulse signal to generate an infrared signal; and
transmitting the infrared signal to an infrared receiver at external of the system platform.

5. The operation method of a system platform according to claim 4, further comprising:
outputting, by a carrier of the infrared transmitter, a carrier signal to an input terminal of an AND gate of the infrared transmitter;
outputting, by the transmission interface, the infrared impulse signal to the other input terminal of the AND gate;
performing, by the AND gate, an AND gate operation on the carrier signal and the infrared impulse signal to generate an infrared signal, and outputting the infrared signal to an infrared light emitting diode (LED) of the infrared transmitter; and
transmitting, by the infrared LED, the infrared signal to an infrared receiver at external of the system platform.

6. The operation method of a system platform according to claim 1, wherein the transmission interface is one of a general purpose input output (GPIO), a radio frequency (RF) interface, a BLUETOOTH, a near field communication (NFC) interface, a secure digital input/output (SD I/O), a serial peripheral interface (SPI), and a universal serial bus (USB).

7. An operation method of a system platform, comprising:
receiving, by an infrared interface, an infrared signal from a consumer infrared (CIR) device during a booting stage of the system platform, the infrared signal containing encoded event data;
transmitting, by the infrared receiver, the infrared signal to a transmission interface;
generating, by the transmission interface, an interrupt notification signal in response to received infrared signal;
transmitting, by the transmission interface, the infrared signal to a universal extensible firmware interface (UEFI) basic input output system (BIOS);
in response to the interrupt notification signal, executing, by the UEFI BIOS, a decoding driver program, and monitoring, by the UEFI BIOS, the transmission interface;
while monitoring, receiving, by the infrared interface, the infrared signal; and
decoding, by the UEFI BIOS, the infrared signal into event data, and storing the event data in a storage device.

8. The operation method of a system platform according to claim 7, further comprising:
checking, by the UEFI BIOS, to check whether the infrared signal is a valid command; and
generating, by the UEFI BIOS, an event according to the event data.

9. The operation method of a system platform according to claim 7, further comprising:
receiving, by the UEFI BIOS, an infrared transmission request, so as to execute a coding driver program of the UEFI BIOS;
coding, by the UEFI BIOS, event data into an infrared impulse signal; and
transmitting, by the UEFI BIOS, the infrared impulse signal to the infrared transmitter through the transmission interface.

10. The operation method of a system platform according to claim 9, further comprising:
adding, by the infrared transmitter, a carrier signal into the infrared impulse signal to generate an infrared signal; and
transmitting the infrared signal to an infrared receiver at external of the system platform.

11. The operation method of a system platform according to claim 10, further comprising:
outputting, by a carrier of the infrared transmitter, a carrier signal to an input terminal of an AND gate of the infrared transmitter;
transmitting, by the transmission interface, the infrared impulse signal to the other input terminal of the AND gate;
performing, by the AND gate, an AND gate operation on the carrier signal and the infrared impulse signal to generate an infrared signal, and outputting the infrared signal to an infrared light emitting diode (LED) of the infrared transmitter; and
transmitting, by the infrared LED, the infrared signal to an infrared receiver at external of the system platform.

12. The operation method of a system platform according to claim 7, wherein the transmission interface is one of a general purpose input output (GPIO), a radio frequency (RF) interface, a BLUETOOTH, a near field communication (NFC) interface, a secure digital input/output (SD I/O), a serial peripheral interface (SPI), and a universal serial bus (USB).

13. A system platform, comprising:
an infrared receiver, used to receive an infrared signal from a consumer infrared (CIR) device in an operating system stage, the infrared signal containing encoded event data;
a transmission interface, used to receive the infrared signal transmitted by the infrared receiver and to generate an interrupt notification signal in response to the received infrared signal;
an advanced configuration and power interface (ACPI), used to receive the interrupt notification signal sent by the transmission interface;
an operation system power management agent (OSPM), used to receive the interrupt notification signal sent by the ACPI;
a UEFI BIOS, used to receive the infrared signal from the transmission interface, and decode the infrared signal into event data; and
a storage device, used for the UEFI BIOS to store the event data therein,
wherein the OSPM executes an infrared application program running under the operating system stage is executed in response to the interrupt notification signal received from the transmission interface, so as to generate a system management interrupt (SMI) in the UEFI BIOS to execute a system management mode (SMM) program, causing the system plat form to enter a BIOS stage from an operating system stage; the UEFI BIOS executes a decoding driver program in the BIOS stage, receives the infrared signal from the transmission interface and decodes the infrared signal into the event data, and stores the event data in the storage device.

14. The system platform according to claim 13, wherein the system platform returns from the SMM program to execute the infrared application program, accesses the event data from the storage device, and generates an event according to the event data accessed from the storage device.

15. The system platform according to claim 13, further comprising: an infrared transmitter, used to convert an infrared impulse signal into the infrared signal, and transmit the infrared signal, wherein the system platform executes an infrared application program running under the operating system to generate an SMI in the UEFI BIOS, so as to execute an SMM program; the UEFI BIOS executes a coding driver program, so as to code event data accessed from the storage device into the infrared impulse signal; and the UEFI BIOS transmits the infrared impulse signal to the infrared transmitter through the transmission interface.

16. The system platform according to claim 13, wherein the transmission interface is one of a general purpose input output (GPIO), a radio frequency (RF) interface, a BLUETOOTH, a near field communication (NFC) interface, a secure digital input/output (SD I/O), a serial peripheral interface (SPI), and a universal serial bus (USB).

17. A system platform, comprising:
an infrared receiver, used to receive an infrared signal from a consumer infrared (CIR) device in a booting stage of the system platform, the infrared signal containing encoded event data;
a transmission interface, used to receive the infrared signal transmitted by the infrared receiver and to generate an interrupt notification signal in response to the received infrared signal;
a universal extensible firmware interface (UEFI) basic input output system (BIOS), used to receive the infrared signal transmitted by the transmission interface, and decode the infrared signal into event data in response to the interrupt notification signal; and
a storage device, used for the UEFI BIOS to store the event data therein,
wherein the UEFI BIOS executes a decoding driver program, monitors the transmission interface, decodes the infrared signal received and transmitted by the transmission interface while monitoring the transmission interface into the event data, and stores the event data in the storage device.

18. The system platform according to claim 17, wherein the UEFI BIOS checks to see whether the infrared signal is correct and generates an event according to the event data.

19. The system platform according to claim 17, further comprising: an infrared transmitter, used to convert an infrared impulse signal into the infrared signal, and transmit the infrared signal, wherein the UEFI BIOS receives an infrared transmission request to execute a coding driver program of the UEFI BIOS, and transmits the infrared impulse signal to the infrared transmitter through the transmission interface.

20. The system platform according to claim 17, wherein the transmission interface is one of a general purpose input output (GPIO), a radio frequency (RF) interface, a BLUETOOTH, a near field communication (NFC) interface, a secure digital input/output (SD I/O), a serial peripheral interface (SPI), and a universal serial bus (USB).

* * * * *